No. 772,732. PATENTED OCT. 18, 1904.
E. C. & J. H. MORGAN.
SWITCHING SYSTEM FOR COMBINED THIRD AND TRACTION RAILS
FOR ELECTRIC RAILWAYS.
APPLICATION FILED AUG. 8, 1904.
NO MODEL.
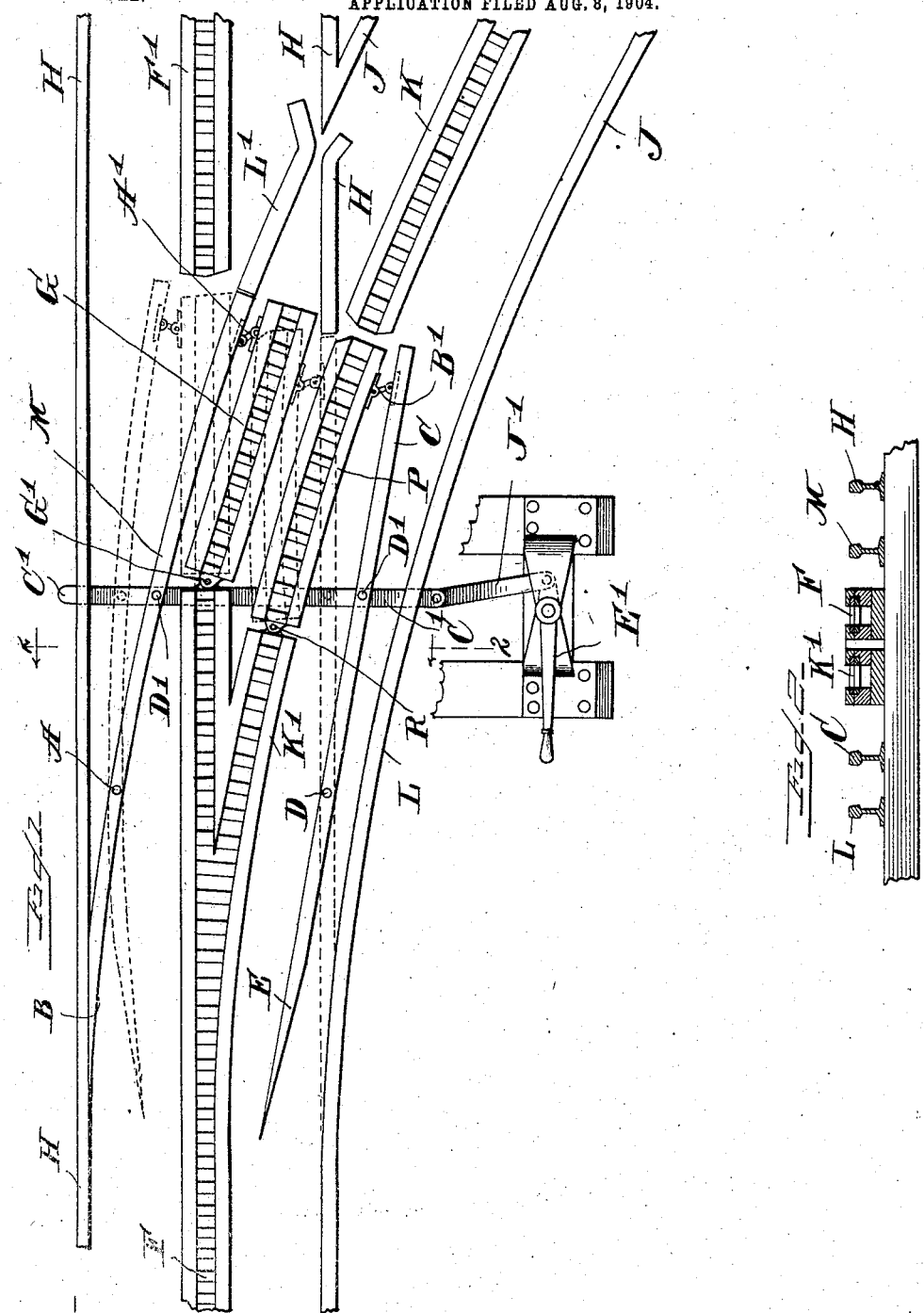

No. 772,732. Patented October 18, 1904.

UNITED STATES PATENT OFFICE.

EDMUND C. MORGAN AND JOHN H. MORGAN, OF CHICAGO, ILLINOIS, ASSIGNORS TO MORGAN ELECTRIC MACHINE COMPANY, OF EAST CHICAGO, INDIANA, A CORPORATION OF WEST VIRGINIA.

SWITCHING SYSTEM FOR COMBINED THIRD AND TRACTION RAILS FOR ELECTRIC RAILWAYS.

SPECIFICATION forming part of Letters Patent No. 772,732, dated October 18, 1904.

Application filed August 8, 1904. Serial No. 219,889. (No model.)

*To all whom it may concern:*

Be it known that we, EDMUND C. MORGAN and JOHN H. MORGAN, citizens of the United States, residing at Chicago, in the county of Cook and State of Illinois, have invented a new and useful Switching System for Combined Third and Traction Rails for Electric Railways, of which the following is a specification.

This invention relates to switching system for combined third and traction rails for electric railways.

The object of the invention is to simplify and improve the construction of devices of this nature and to render the same more efficient in operation.

A further object of the invention is to provide a system of the character referred to wherein cars may be readily switched from one track to another or others while maintaining traction engagement between the traction or rack rail and the propelling sprocket-gear carried by the car.

A further object of the invention is to provide means in a system of the character referred to whereby the track-rails as well as the traction or rack rails are provided with movable sections at switches, turnouts, or crossovers and which several sections are so connected together as to be operated in unison to be shifted into and out of coöperative relation.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in plan, parts broken off, of a switching system for combined third and traction rails for electric railways embodying the principles of our invention. Fig. 2 is a transverse section of the same on the line 2 2, Fig. 1, looking in the direction of the arrows.

In Patent No. 753,802, issued March 1, 1904, to E. C. Morgan, is shown, described, and claimed a combined third and traction rail for electric railways and switching system embodying the same, wherein is provided a combined third and traction rail for electric railways serving not only as a conductor for supplying current to a motor on a truck, but also adapted to be engaged by gearing carried by the truck and operated by the motor thereon for causing the truck to move along the track. In order to permit the use of a traction rack-rail of the character referred to, and especially at the junction of a branch or connecting line, it is necessary to make provision for a constant engagement of the driving-gear on the truck with the traction or rack rail while passing over the switch. This result is accomplished in the patent above referred to by placing the traction-rack over the switching-rails, so that when the truck progresses along any particular pair of track-rails a continuous traction-rack rail is provided. To this end the track-rails are provided in the construction of the patent referred to with switching-points, and the traction-rack is provided with pivotal or movable sections, and provision is made in the patent referred to for shifting coincidently the switching-points of the track-rails and the movable sections of the rack-rails, the latter being shifted from position over the switching track-rails when it is desired to shift the truck from one pair of track-rails to another. In the construction of the patent referred to, however, the traction or rack rails are placed over or above the track-rails. Under some circumstances it is necessary to locate the rack-rail on the same level or at the same height or beneath or below the plane of the tread-surfaces of the track-rails, in which event it is impossible to shift the rack-rail sections without the provision of some means for coöperatively and correspondingly shifting the track-rails.

It is among the special purposes of our present invention to provide a switching system for electric railways employing traction-rack rails wherein the traction-rack is located on a level with or below the plane of the tread-surfaces of the track-rails.

In the accompanying drawings, showing one form of apparatus embodying the principles of our invention, H designates the main track-rails, and J the rails of a branch line communicating with or intersecting the main track-rails H by means of a switch. The switch track-rails comprise fixed curved portions L L', and coöperating with the latter is a pivotal section or portion M, said portion being pivoted, as at A, intermediate the ends thereof, one end lying adjacent to the fixed curved section L' and the other end thereof (indicated at B) being tapered and forming a switch-point, said switch-point portion coöperating with one of the main track-rails H, as clearly shown. Similarly one of the main track-rails H is provided with a fixed portion H' and a movable portion C, said movable portion being pivotally mounted, as at D, at a point intermediate the ends thereof, one end of the movable portion C of the main track-rail adapted to be brought into alinement and coöperative relation with respect to the fixed portion H', while the other end of said movable portion C is tapered, as at E, to form a switching-point and coöperating with the curved portion L of the switch track-rail J. We provide a traction-rack for each pair of rails. For instance, the main track-rails are provided with a traction-rack F F', which may be of any suitable construction and which is provided with a movable section G, hinged or pivoted or otherwise suitably connected at one end thereof, as at G', to the main portion F of the rack-rail. Similarly the switch track-rails J are provided with a traction-rack portion K K', which are fixed, the latter being joined to the main-track-rack portion F, together with an intermediate movable section or portion P, pivotally connected at one end, as at R, to the portion K' of the switch track-rack. The movable section G of the main track-rack is connected in any suitable manner — as, for instance, by means of link A'—to the movable track portion M, while the movable rack-section P is similarly connected by link B' to the movable track-section C. A slide or control bar C' is pivotally connected, as at D', to the movable track-sections C M, respectively. The slide or control bar C' may be actuated in any suitable or convenient manner—as, for instance, by means of a hand-lever E', link J', and intermediate connections.

From the foregoing description it will be seen that when the control-bar C' is shifted endwise the track-sections C M will be rocked or swung about their pivotal points D A, respectively, while at the same time the associated and connected rack-sections P G will be correspondingly and coöperatively shifted or moved into position. In the construction as shown in full lines in Fig. 1 the track-section M has been shifted or moved into position for the switching-point B at one end thereof to lie against the main track-rail H, while the other end of said movable section M is brought into registering alinement with the portion L' of the switch track-rail. At the same time the movable section G of the main track-rack is shifted or moved out of coöperative relation with respect to the main track-rack and into such position as not to interfere with the passage of truck-wheels along the movable track portion M. At the same time the movable track portion C is moved or swung into such position that the switching-point E thereof is moved out of coöperative relation with respect to track-rail L, while the opposite end thereof is moved out of coöperative alinement or arrangement with respect to the main track portion H', while the movable section P of traction-rack is shifted or moved at the same time into coöperative position with respect to sections K K' to form substantially a continuation of the traction-rack of the switching track-rails. The parts are thus arranged for a truck or car to proceed along the switch track-rails to or from the main track-rails. If, however, the switch or control bar C' is shifted into the other position thereof, the parts above referred to will be shifted or moved into the position indicated by dotted lines, with the result that a car or truck will be free to move or proceed along the main track-rails with a substantially continuous traction-rack presented and with the switch-track-rack section shifted or moved out of position to interfere.

In the manner above described it will be observed that we provide a construction wherein the track-rails are provided with movable portions, and the rack-rails are also provided with coöperating and corresponding movable portions and that these movable portions are so relatively arranged and connected as to be shifted or moved in unison, while at the same time the traction-racks are located on a level with or below the plane of the tread-surfaces of the track-rails.

A construction embodying the above principles, it will be observed, is useful where the traction-gears which mesh with the traction-rack have a pitch diameter substantially equal to the diameter of the tread of the truck-wheels, and hence may be actuated at the same peripheral speed as that of the truck-wheels without the employment of intermediate reduction-gears to accomplish such result, and this we regard as an important and valuable feature of our invention.

We have referred to the traction-rack as being a combined third and traction rail. It is obvious, however, that our invention is equally well adapted for use in connection with a rack-rail system without employing the traction-rack rail as a conductor-rack.

We do not desire, therefore, to be limited in this respect. It is also obvious that many specifically-different constructions and arrangements of apparatus may be employed for shifting the track and rack rail sections without departure from the spirit and scope of our invention.

Having now set forth the object and nature of our invention and a construction and arrangement embodying the principles thereof, what we claim as new and useful and of our own invention, and desire to secure by Letters Patent, is—

1. In an apparatus of the class described, and in combination with main and branch track-rails and switching track-rails, of a traction-rack for each pair of track-rails, said traction-rack being made in movable sections, and said track-rails also provided with movable sections or portions, said traction-racks lying in substantially the same horizontal plane as the tread-surfaces of the track-rails, and means for shifting said movable rack and track sections or portions.

2. In an apparatus of the class described, and in combination with main and branch track-rails and switching track-rails, of a traction-rack for each pair of track-rails, said traction-racks lying in the same horizontal plane as the tread-surfaces of said track-rails, said traction-racks each made in sections, one section of each rack being movable.

3. In an apparatus of the class described, and in combination with main and branch track-rails and switching track-rails, of a traction-rack for each pair of track-rails, said traction-racks occupying substantially the same horizontal plane as the tread-surfaces of the track-rails, said traction-racks and track-rails made in sections, one section of each rack and rail being movable, and connections between said movable sections for coincident movement thereof.

4. In an apparatus of the class described, and in combination with main and branch track-rails and switching track-rails, said rails having sections pivotally mounted intermediate their ends, traction-racks for each pair of rails, said racks provided with movable sections respectively connected to the pivotal sections of the track-rails, and means for rocking said track-rails.

5. In an apparatus of the class described, main and branch track-rails and switching track-rails, said rails having sections pivotally mounted intermediate their ends, whereby said sections may be rocked or swung into and out of alining relation with the other sections of said rails, a traction-rack for each pair of rails, each traction-rack having movable sections adapted to be moved into and out of alining relation with respect to their coöperating sections, link connections between each rack-section and adjacent track-sections, and means for rocking said track-sections.

6. In an apparatus of the class described, main and branch track-rails and switching track-rails, said rails having movable sections, one end of each movable section forming a switching-point and the other end of said section adapted to be brought into and out of alinement with adjacent track portions, the switching-point portions coöperating with adjacent track portions, and traction-racks for each pair of rails, said traction-racks made in correspondingly-movable sections, connections between the movable track-sections and the corresponding rack-sections, and means for rocking said track-sections coincidently.

In witness whereof we have hereunto set our hand this 6th day of August, 1904, in the presence of the subscribing witnesses.

EDMUND C. MORGAN.
JOHN H. MORGAN.

Witnesses:
C. H. SEEM,
S. E. DARBY.